(12) United States Patent
Nguyen et al.

(10) Patent No.: US 8,851,567 B2
(45) Date of Patent: Oct. 7, 2014

(54) TIE DOWN CORD ASSEMBLY AND METHOD OF MAKING AND USING SAME

(75) Inventors: Thanh Phat Nguyen, Macomb, MI (US); Timothy M. Russell, Anniston, AL (US); Larry W. Thompson, Anniston, AL (US); John E. Jennings, Anniston, AL (US); Brian Micheal Lang, Redford, MI (US); Terry Louis Brown, Oxford, AL (US)

(73) Assignee: YKK Corporation (JP)

( * ) Notice: Subject to any disclaimer, the term of this patent is extended or adjusted under 35 U.S.C. 154(b) by 376 days.

(21) Appl. No.: 13/300,210

(22) Filed: Nov. 18, 2011

(65) Prior Publication Data

US 2013/0127216 A1    May 23, 2013

(51) Int. Cl.
*A47C 27/00* (2006.01)
*B60N 2/58* (2006.01)
*D03D 11/02* (2006.01)

(52) U.S. Cl.
CPC .......... *B60N 2/5825* (2013.01); *D10B 2505/12* (2013.01); *D03D 11/02* (2013.01); *D10B 2505/08* (2013.01)
USPC ..................................................... 297/218.4

(58) Field of Classification Search
CPC ...... A47C 31/02; A47C 31/11; D03D 13/004; D03D 3/005; B60N 2/6027; B60N 2/585; B60N 2/609
USPC ........ 297/218.1, 218.3, 218.4, 218.5, 228.11, 297/228.12
See application file for complete search history.

(56) References Cited

U.S. PATENT DOCUMENTS

| | | | | |
|---|---|---|---|---|
| 1,768,454 A | * | 6/1930 | King | 297/228.11 |
| 2,161,448 A | * | 6/1939 | Bishop | 297/228.11 |
| 3,747,178 A | * | 7/1973 | Harder, Jr. | 29/91.1 |
| RE33,586 E | * | 5/1991 | Graff | 2/221 |
| 5,338,092 A | * | 8/1994 | Wiltsey et al. | 297/228.11 |
| 5,529,373 A | | 6/1996 | Olson et al. | |
| 5,716,096 A | * | 2/1998 | Pryde et al. | 297/228.11 |
| 5,768,758 A | * | 6/1998 | Deignan et al. | 29/91.1 |
| 6,397,638 B1 | * | 6/2002 | Roell | 66/61 |
| 6,976,737 B1 | * | 12/2005 | Dandolo | 297/218.3 |
| 8,128,166 B2 | * | 3/2012 | Hoshina et al. | 297/218.4 |
| 2010/0060069 A1 | | 3/2010 | Hoshina et al. | |

FOREIGN PATENT DOCUMENTS

EP            2431506      *   3/2012

* cited by examiner

*Primary Examiner* — Laurie Cranmer
(74) *Attorney, Agent, or Firm* — Kilpatrick Townsend & Stockton LLP (57) ABSTRACT

Disclosed are tie down cord assemblies and methods of assembling same. According to some aspects, the tie down cord assembly includes a webbing having a tunnel portion and a flat portion, with the tunnel portion configured to receive a slotted cord and the flat portion configured to attach to fabric. The slotted cord weaves in and out of the tunnel portion and is configured to interact with a seat frame or other suitable structure to secure the fabric to a seat frame. The tie down cord assembly is configured to be universal so that it can be used with seat frames having different dimensions and/or configurations.

22 Claims, 11 Drawing Sheets

|   | Weave Plan | LENGTH | 31 |
|---|---|---|---|
| 1 | DCIN | 2 | 0.25806 |
| 2 | DCOUT | 120 | 15.4839 |
| 3 | DCIN | 238 | 30.7097 |
| 4 | DCOUT | 15 | 1.93548 |
| 5 | DCIN | 116 | 14.9677 |
| 6 | DCOUT | 15 | 1.93548 |
| 7 | DCIN | 116 | 14.9677 |
| 8 | DCOUT | 15 | 1.93548 |
| 9 | DCIN | 238 | 30.7097 |
| 10 | DCOUT | 120 | 15.4839 |
|   |   |   | 128.387 |

TIE DOWN CORD ASSEMBLY AND METHOD OF MAKING AND USING SAME

FIELD OF THE INVENTION

Embodiments generally relate to a tie down cord assembly for attaching fabric or other covering to a seat or other structure and methods of attaching same.

BACKGROUND OF THE INVENTION

Fabric or another suitable covering is typically attached to an underlying frame of a vehicle seat during assembly of the seat. The underside of a typical seat frame includes a plurality of anchors, such as hooks or posts. In some instances, the fabric is attached to the frame by means of a webbing having a cord. In particular, the webbing is sewn to the fabric and the fabric is secured to the seat frame by hooking the cord around the frame's existing anchors. In such configurations, each end of the cord typically includes an attachment mechanism such as a fabricated loop, a crimped collar, or a molded hook that is then secured by a hog-ring or otherwise to the underside of the seat to fixedly position the webbing and fabric assembly with respect to the seat frame. Because the ends of the cord require special treatment, the webbing must be pre-manufactured for the particular seat frame with which it will be used. In particular, each webbing piece must be cut, fabricated, and then shipped at a specific length to fit the particular seat with which it will be used. Because there are multiple seat cover designs that require different length pieces, a user is required to order many part numbers and many different sizes of webbing, which increases inventory and storage costs, as well as results in space constraints at a user's facility.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In one aspect, provided is a tie down cord assembly for securing fabric to a vehicle seat, the assembly comprising: a webbing comprising a tunnel portion and a flat portion that is configured to attach to the fabric; a cord comprising a plurality of slot sections and a plurality of flat sections, wherein adjacent slot sections are separated by one of the flat sections, wherein each slot section comprises an upper portion and a lower portion, wherein the cord is received within the tunnel portion of the webbing and is woven out of the tunnel portion and back into the tunnel portion at predetermined intervals along the webbing; and wherein the cord is configured to attach to an underside of the seat between two ends of the webbing in a first attachment manner and wherein the cord is configured to attach to the seat at the two ends of the webbing in a second attachment manner that is different from the first attachment manner.

According to a further aspect, the second attachment manner comprises separating the upper portion of one of the slot sections from the lower portion of that slot section to form a loop, wherein the loop is configured to attach to a component associated with the underside of the seat.

According to a further aspect, the first attachment manner comprises looping the cord around a component associated with the underside of the seat.

According to a further aspect, the cord is provided on rolls or spools.

According to a further aspect, the tie down cord assembly is provided on rolls or spools.

According to a further aspect, the upper portion of the slot sections has a tensile property that is different from a tensile property of the lower portion of the slot sections.

According to a further aspect, the upper portions of the slot sections comprise a plurality of warp yarns that are either nylon or polyester and wherein the lower portions of the slot sections comprise a plurality of warp yarns that are the other of nylon or polyester.

According to a further aspect, the cord comprises a plurality of warp yarns, a first set of weft yarns, and a second set of weft yarns, wherein, in the cord flat sections, the plurality of warp yarns are woven together using both the first set of weft yarns and the second set of weft yarns, and wherein, in the cord slot sections, some of the plurality of warp yarns are woven together with the first set of weft yarns to form the upper portions of the slot sections and wherein the rest of the plurality of warp yarns are woven together with the second set of weft yarns to form the lower portions of the slot sections.

Also provided is a method of installing a tie down cord assembly comprising: providing a cord comprising a plurality of slot sections and a plurality of flat sections, wherein adjacent slot sections are separated by one of the flat sections and wherein the slot sections each comprise an upper portion and a lower portion that together define a loop; providing the cord within a tunnel portion of a webbing to form a tie down cord assembly, wherein the cord is woven out of the webbing at predetermined exit points and the cord is woven back into the webbing at predetermined entrance points; securing the tie down cord assembly to a fabric; attaching a portion of the fabric to an underside of a vehicle seat by, at various locations between the ends of the webbing, securing the cord that is woven out of the webbing at the predetermined exit points to anchors provided on the underside of the vehicle seat; and at or near the ends of the webbing, cutting the cord along the loop of one of the slot sections and attaching the cord to the underside of the vehicle seat via the loop of the preceding slot section.

According to a further aspect of the method, the cord is provided on spools or rolls.

According to a further aspect of the method, the tie down cord assembly is provided on spools or rolls.

According to a further aspect of the method, the webbing to the underside of the vehicle seat is attached in a first manner between the ends of the webbing and the webbing is attached to the underside of the vehicle seat in a second manner at or near the ends of the webbing, wherein the first manner is different from the second manner.

According to a further aspect of the method, the second attachment manner comprises separating the upper portion of the slot section from the lower portion of the slot section and attaching the cord to the underside of the seat via the loop.

According to a further aspect of the method, the first attachment manner comprises looping the cord around an anchor associated with the underside of the seat.

According to a further aspect of the method, the cord is woven within the webbing so that at least one slotted portion of the cord is woven out of the webbing at at least some of the predetermined exit points.

According to a further aspect of the method, the cord is woven into the tunnel portion of the webbing.

Also provided is a tie down cord assembly comprising: a fabric comprising a flat portion and a tubular section; a cord comprising a plurality of warp yarns, a first set of weft yarns, and a second set of weft yarns; wherein the plurality of warp yarns are woven together using both the first set of weft yarns and the second set of weft yarns to form a plurality of cord flat sections; and wherein some of the plurality of warp yarns are woven together with the first set of weft yarns to form an upper portion of a slot section and wherein the rest of the plurality of warp yarns are woven together with the second set of weft yarns to form a lower portion of the slot section, wherein there are a plurality of cord slot sections and the cord flat sections separate the cord slot sections from one another; wherein the upper portions of the slot sections have a first tensile property that is different from a second tensile property of the lower portions of the slot sections; and wherein the cord is received within the fabric.

According to a further aspect, the warp yarns of the upper portions are either nylon or polyester and the warp yarns of the lower portions are the other of nylon or polyester.

According to a further aspect, the cord is configured to attach to a vehicle seat via a first attachment mechanism between ends of the fabric and wherein the cord is configured to attach to the vehicle seat via a second attachment mechanism at or near the ends of the fabric, where the second attachment mechanism is different from the first attachment mechanism.

According to a further aspect, the second attachment mechanism comprises separating the upper portion of one of the slot sections from the lower portion of that slot section to form a loop, and attaching the cord to an underside of the vehicle seat via the loop.

BRIEF DESCRIPTION OF THE FIGURES

A full and enabling disclosure including the best mode of practicing the appended claims and directed to one of ordinary skill in the art is set forth more particularly in the remainder of the specification. The specification makes reference to the following appended figures, in which use of like reference numerals in different figures is intended to illustrate like or analogous components.

DETAILED DESCRIPTION OF THE INVENTION

Figure 1:
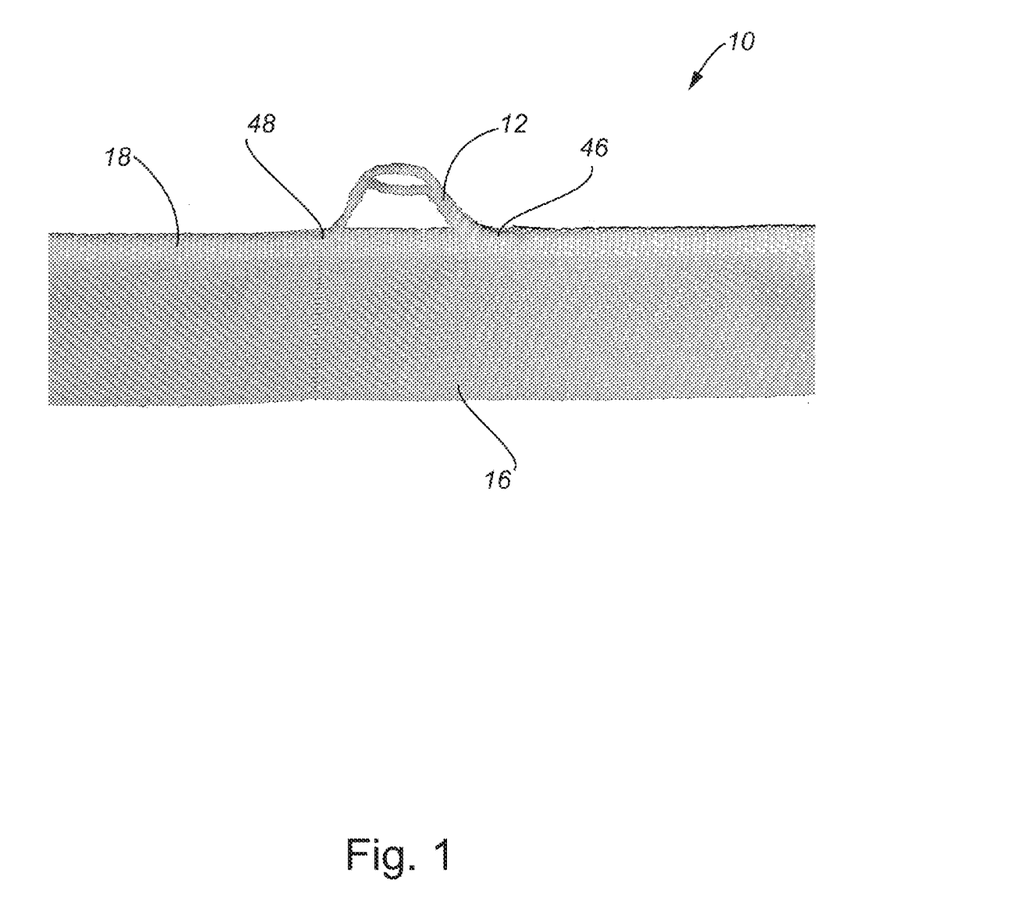
FIG. 1 is a photograph of a portion of a tie down cord assembly according to one embodiment.
Figure 2:
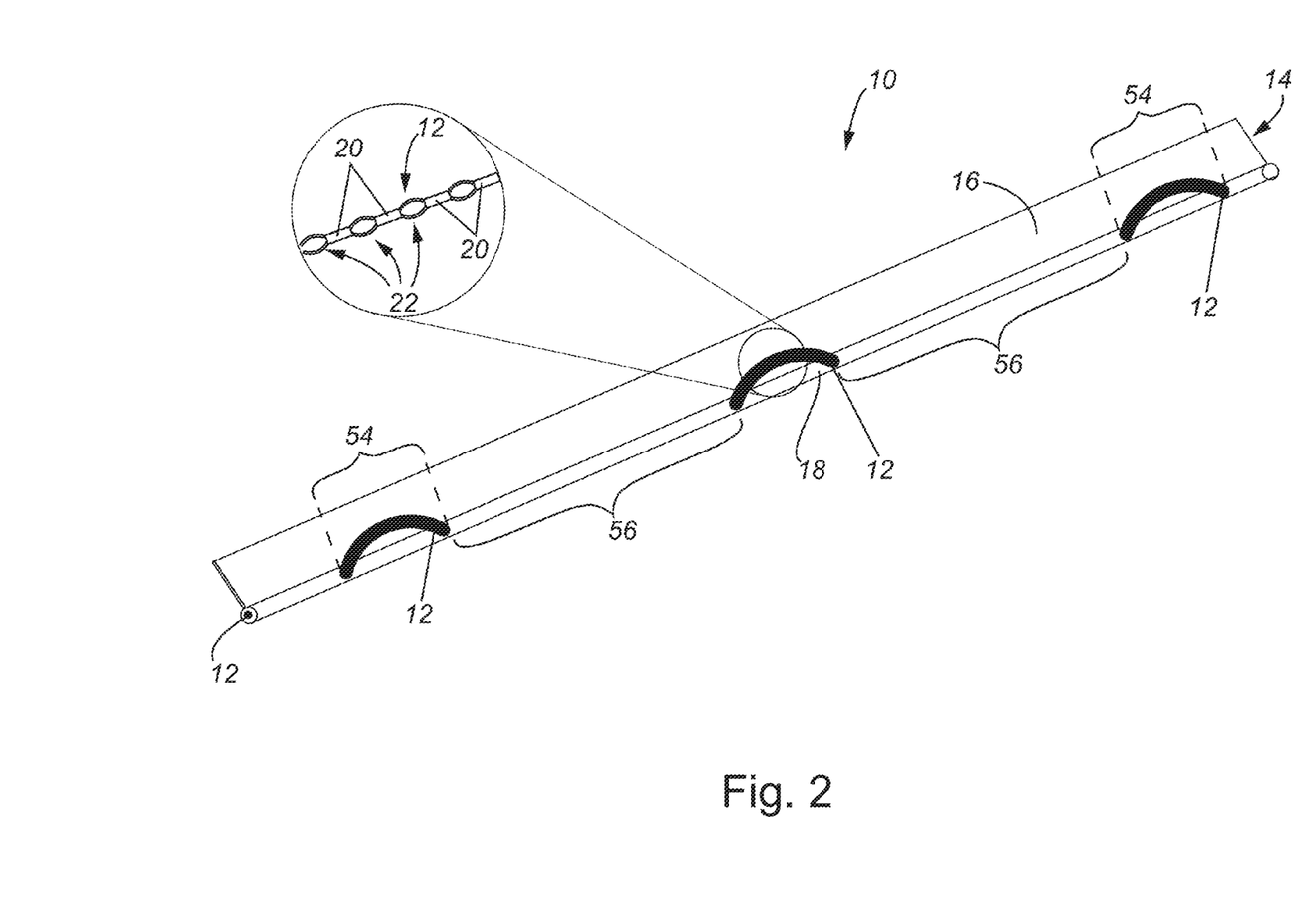
FIG. 2 is an illustration of a tie down cord assembly according to another embodiment.

Provided are tie down cord assemblies for assembling fabric, upholstery, or other covering to a seat, furniture, or other suitable structure. As shown in FIGS. 1-2, tie down cord assembly 10 includes a webbing 14 and a cord 12 that is interwoven with the webbing 14. Instead of being a woven webbing, webbing 14 may be any suitable fabric such as leather, vinyl, etc. As shown in FIG. 2, webbing 14 has a flat portion 16 that is adjacent a tunnel (also referred to as a tubular) portion 18. Cord 12 is received within the tunnel portion 18, and is woven out of the tunnel 18 at predetermined weave-out (also referred to as exit) locations 46 and woven back into the tunnel 18 at predetermined weave-in (also referred to as entrance) locations 48 (see FIG. 1). The cord 12 is therefore outside of the webbing 14 along weave-out portions 54 and is received within the webbing 14 along weave-in portions 56 (see FIG. 2). The distance between the weave-out and weave-in locations may vary. In some embodiments, the weave-out and weave-in locations are spaced apart from one another so as to make the tie down cord assembly a universal type structure, as described in more detail below. The amount of cord 12 that is woven out of the webbing 14 at the weave-out locations, as well as the characteristics of the cord that is woven out of the webbing 14, may also vary. For instance, the amount of cord and the characteristics of the cord woven out of the webbing illustrated in FIG. 1 is different than the embodiment of FIG. 2 (although like reference numerals are used to illustrate like components).

Figure 3:
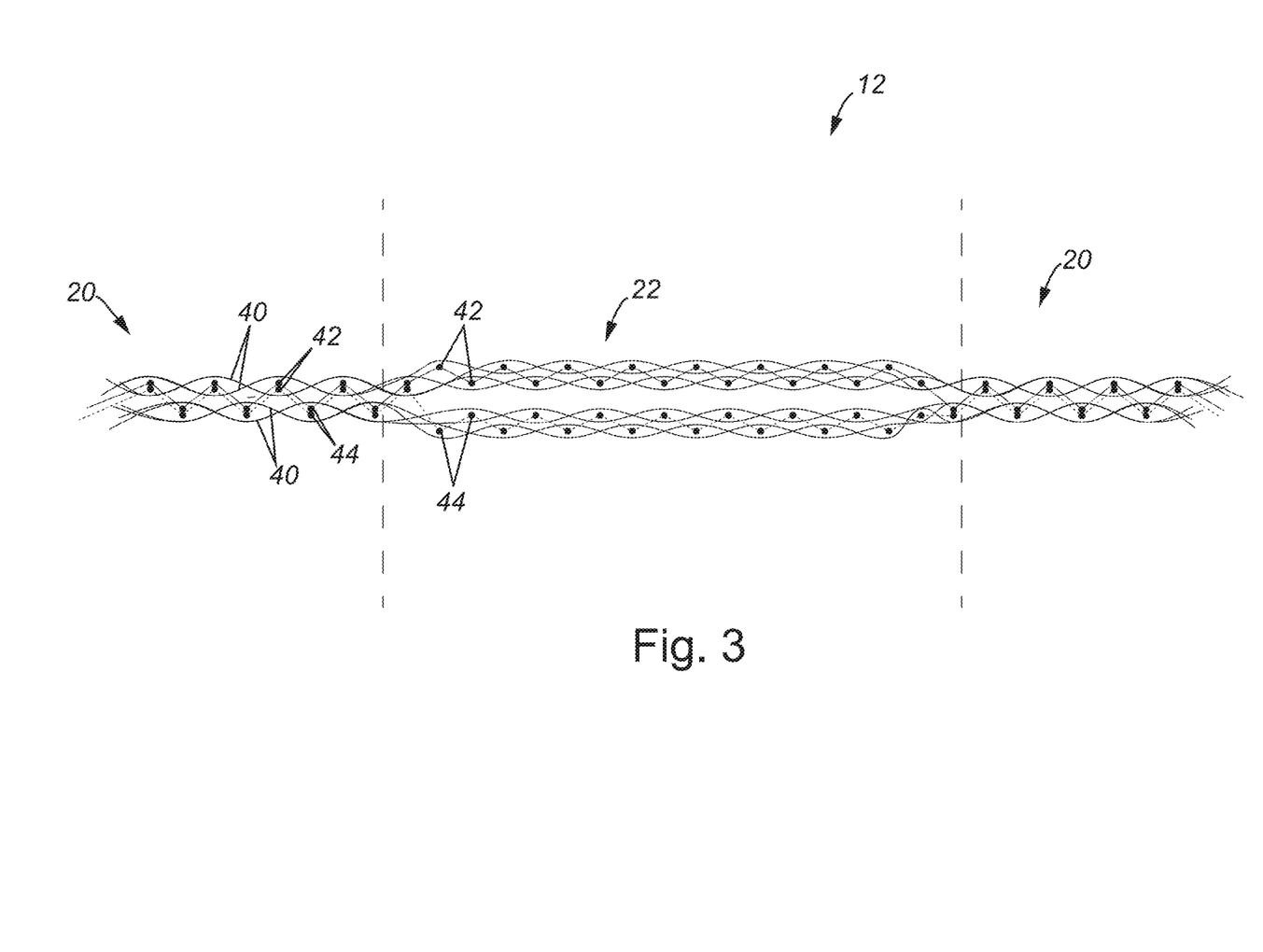
FIG. 3 is a cross-sectional view of a weaving pattern of a portion of the cord of the assembly of FIG. 1.
Figures 4, 5A:
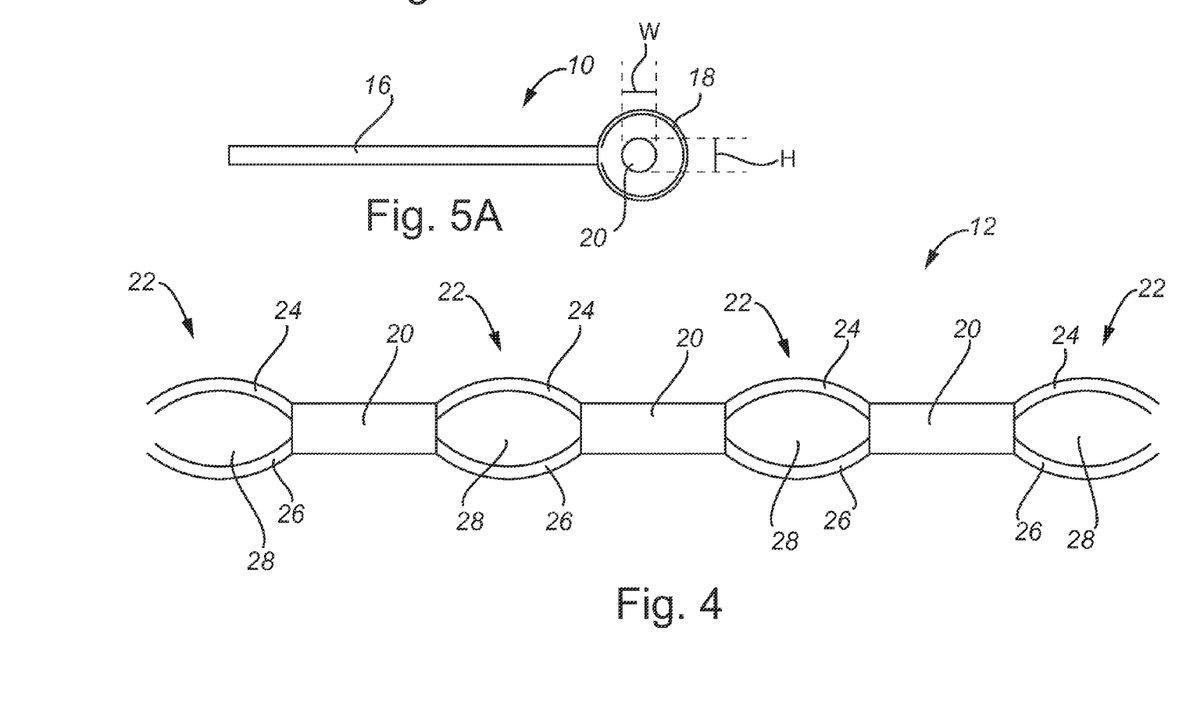
FIG. 4 is a representation of the cord of the assembly of FIG. 1.
FIG. 5A is a cross-sectional view of the tie down cord assembly of FIG. 1, taken at a flat section of the cord.

FIGS. 3-4 illustrate the woven cord 12. Cord 12 includes flat sections 20 that are separated from one another by slot sections 22. Each slot section 22 has an upper portion 24 and a lower portion 26 that together define a loop 28. As shown in FIG. 3, the slotted cord 12 includes a plurality of warp yarns 40, a first set of weft yarns 42, and a second set of weft yarns 44. The warp yarns 40 are woven together using the first set of weft yarns 42 and the second set of weft yarns 44 to form the flat sections 20 of the cord 12. Some of the warp yarns 40 are woven together with the first set of weft yarns 42 to form the upper portion 24 of the slot section 22, while the remainder of the weft yarns 40 are woven together with the second set of weft yarns 44 to form the lower portion 26 of the slot section 22. In this way, the cord 12 is formed by a double weft insertion process. In some embodiments, the slot sections 22 are formed using a Z-shed and the flat sections 20 are formed using a normal shed.

In some embodiments, the upper portion 24 of slot sections 22 has a tensile property that is different from the lower portion 26. In some instances, this is because warp yarns of different materials make up the upper portion 24 and the lower portion 26. For example, in some embodiments, the warp yarns of the upper portion 24 are made of polyester or nylon or an elastic material blend, while the warp yarns of the lower portion 26 are made from the other of polyester or nylon or a different elastic material blend. Having different tensile properties for the upper and lower sections allows the upper portion and the lower portion to separate automatically from each other to form loop 28. Specifically, nylon and polyester have different rates of elongation and different rates of recovery, and therefore using different materials for each of the upper portion and the lower portion causes them to spring apart to create loop 28. Alternatively, the loop 28 may be formed by using weft materials of different sizes for the upper and lower portions or by using different weave patterns for the upper portions and the lower portions. In some embodiments, the warp yarns of both the upper portion 24 and the lower portion 26 are the same material (for example, the warp yarns of both the upper portion and the lower portion may be all nylon or all polyester or any other suitable material or combination of materials). The weft yarns may be polyester, nylon or any other suitable material or combination of materials.

Figure 5B:
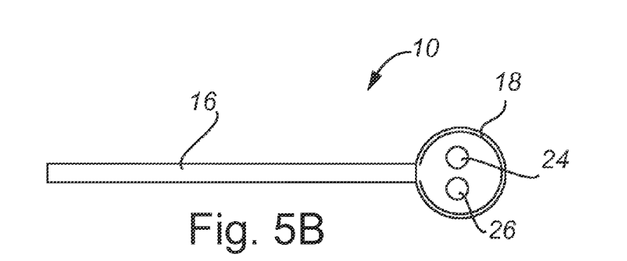
FIG. 5B is a cross-sectional view of the tie down cord assembly of FIG. 1, taken at a slot section of the cord.

The cord 12 as described above is woven with various other warp and weft yarns to create the webbing 18. FIG. 5A is a cross-sectional view of the tie down cord assembly 10 taken along a flat section 20 of the cord 12, while FIG. 5B is a cross-sectional view of the tie down cord assembly 10 taken along a slot section 22 of the cord 12. As shown in FIG. 5A, cord 12 has a height H that is substantially the same as a width W of the cord.

Figure 8:
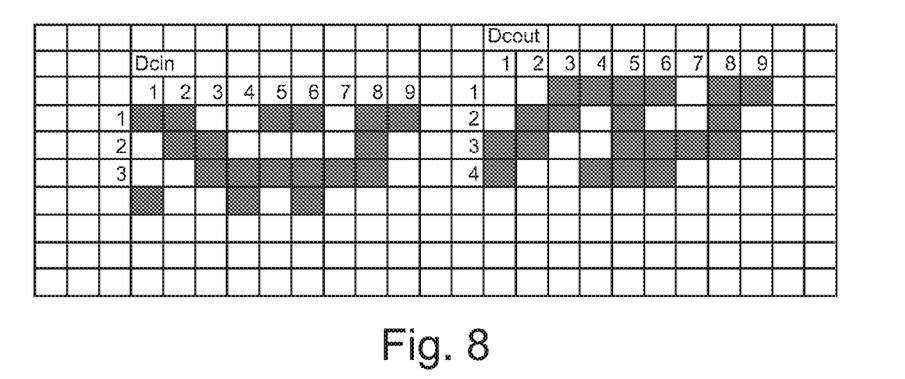
FIG. 8 is a pick diagram of a weaving pattern of the weave-in and weave-out locations of a tie down cord assembly according to one embodiment.

FIG. 8 shows a non-limiting pick diagram (also known as a chain diagram or a cam draft) for the weave-out and weave-in portions 54, 56 of the webbing 14. The weave-out portions are referred to as "Dcout" in FIG. 8 and the weave-in portions are referred to as "Dcin" in FIG. 8. The horizontal rows of squares represent weft yarns, and the vertical columns (which correspond to harnesses of a loom) represent groups of warp yarns. The pick diagram of FIG. 8 shows a nine harness loom, with harnesses 1-4 receiving the warp yarns that create the flat portion 16 of the webbing 18, harness 5 receiving the cord 12, and harnesses 6-9 receiving the warp yarns that create the tunnel portion 18 of the webbing. When a square is shaded, it indicates that the harness is lifted as the weft yarn is thrown so that the warp yarn is above the weft yarn. As shown in FIG. 8, during the weave-out process (Dcout), harness 5 is lifted so that the cord 12 is not woven with the warp yarns along the weave-out portion. This allows cord 12 to exit the webbing 14 at the weave-out location 46, as shown in FIGS. 1-2. In some embodiments, the weaving pattern at the weave-out portions may be modified so that it is easy to spot where the weave-out portions are (and therefore where the cord 12 exits the webbing 14). For example, a diagonal weave may be used for the tunnel portion at the weave-out portions. Along these lines, any suitable weave can be used to create the assembly 10.

Figure 9:
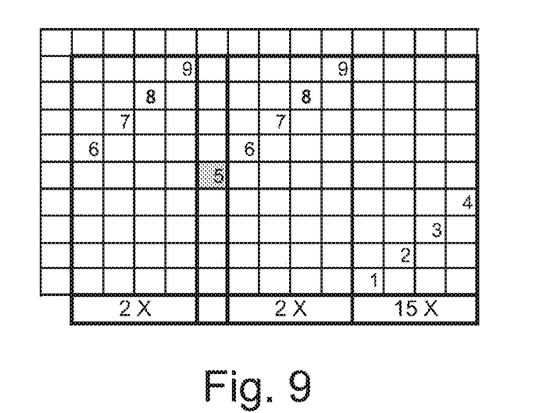
FIG. 9 is a drawing diagram for a tie down cord assembly according to one embodiment.

The non-limiting drawing diagram of FIG. 9 shows the placement of yarns in harnesses to produce one embodiment of the tie down cord assembly 10. The pick diagram of FIG. 8 represents action of the harnesses to create the woven assembly. The vertical axis of FIG. 9 represents the harnesses of a loom used to make the webbing of this particular embodiment. In this embodiment, nine harnesses are used. The horizontal axis of FIG. 9 represents the yarns that are used to create the assembly, with the bottom line showing the number of times each section repeats. For example, the first column of FIG. 9 illustrates that the first yarn is in the sixth harness frame, while the second yarn is in the seventh harness frame. As mentioned above, harnesses 6-9 receive the warp yarns that create the tunnel portion 18 of the webbing 14, harnesses 1-4 receive the warp yarns that create the flat portion 16 of the webbing 14, and harness 5 receives the cord 12.

Figure 6:
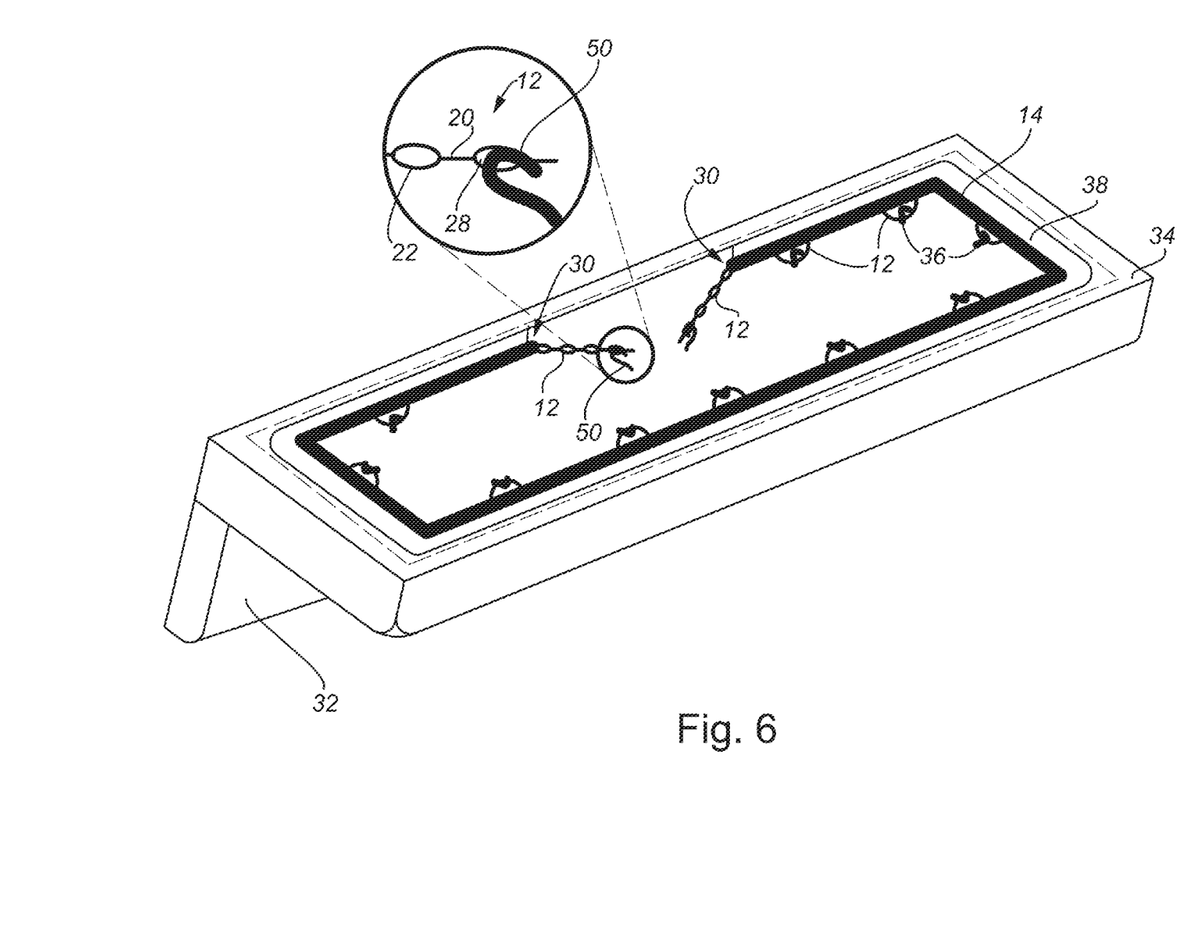
FIG. 6 is a perspective view of the underside of a vehicle seat assembled with fabric and a tie down cord assembly according to one embodiment.
Figure 7:
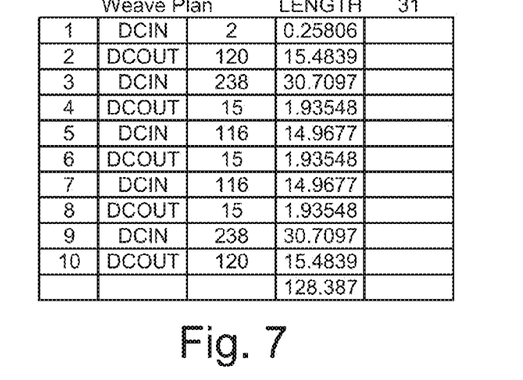
FIG. 7 is a weave plan for a tie down cord assembly according to one embodiment.

A non-limiting weaving plan of one embodiment of the tie down cord assembly 10 is illustrated in FIG. 7, although many different weaving plans may be used to create a suitable assembly. The weaving plan of FIG. 7 shows one particular pattern that may be used to create an assembly 10 (illustrated for example in FIG. 6). Different patterns may be used to create assemblies having different configurations. For example, as described above, the length of the weave-out portions (represented by DCOUT in FIG. 7) and weave-in portions (represented by DCIN in FIG. 7) may vary. The length of each of the weave-out and weave-in portions is shown in inches, with the number of times that particular section repeats shown in the column to the left of the column titled LENGTH.

In some embodiments, the warp yarns of the webbing 14 housed in harnesses 1-4 and 6-9 are polyester, although the warp yarns could be nylon or any other suitable material or combination of materials. Similarly, the weft yarns used to create webbing 14 may be polyester, nylon or any other suitable material or combination of materials.

Figure 10:
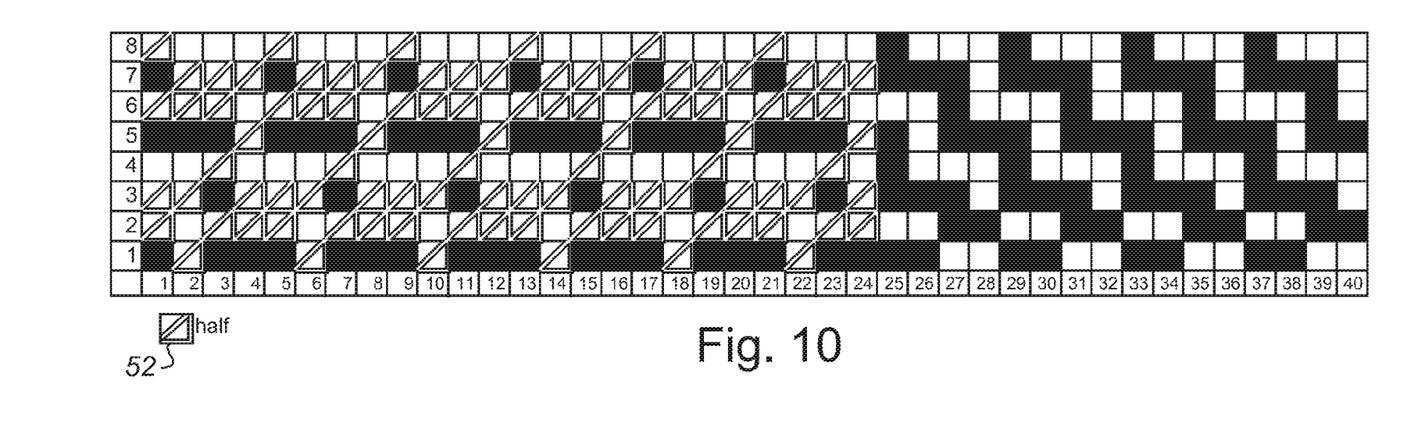
FIG. 10 is a pick diagram of a weaving pattern of a cord according to one embodiment.
Figure 11:
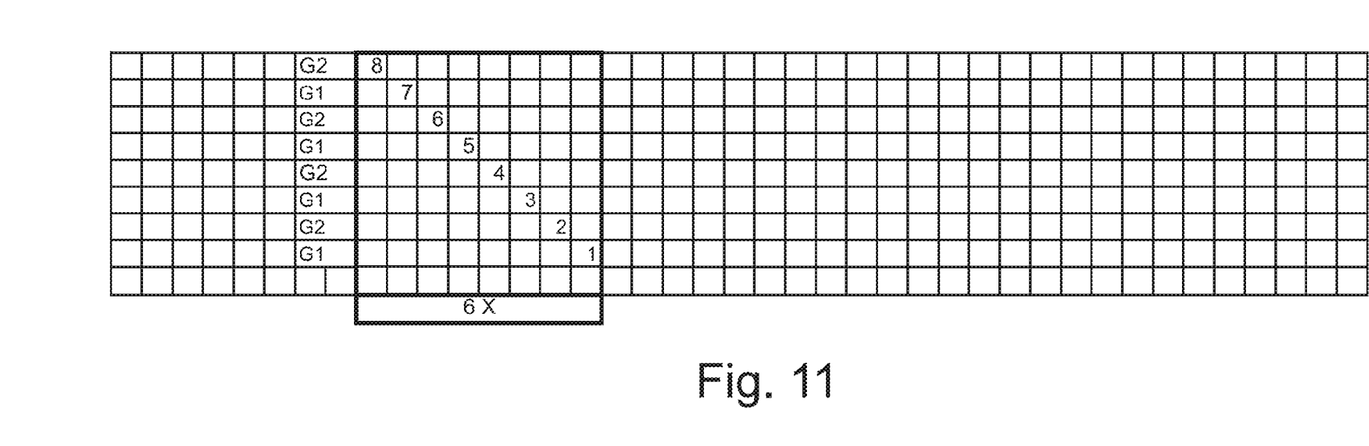
FIG. 11 is a drawing diagram of a weaving pattern of a cord according to one embodiment.

FIG. 10 illustrates a non-limiting pick diagram for the cord 12, which is pre-woven before it is woven with various warp and weft yarns to create webbing 14. The hash-marked squares 52 represent a mid-shed harness position, which allows for a double weft insertion to create the slot sections 22 of the cord 12 (in other words, a first set of weft yarns that weaves with upper warp yarns and a second set of weft yarns that weaves with lower warp yarns, as described above). FIG. 11 shows a non-limiting weaving plan of one embodiment of the cord 12.

Figure 12:
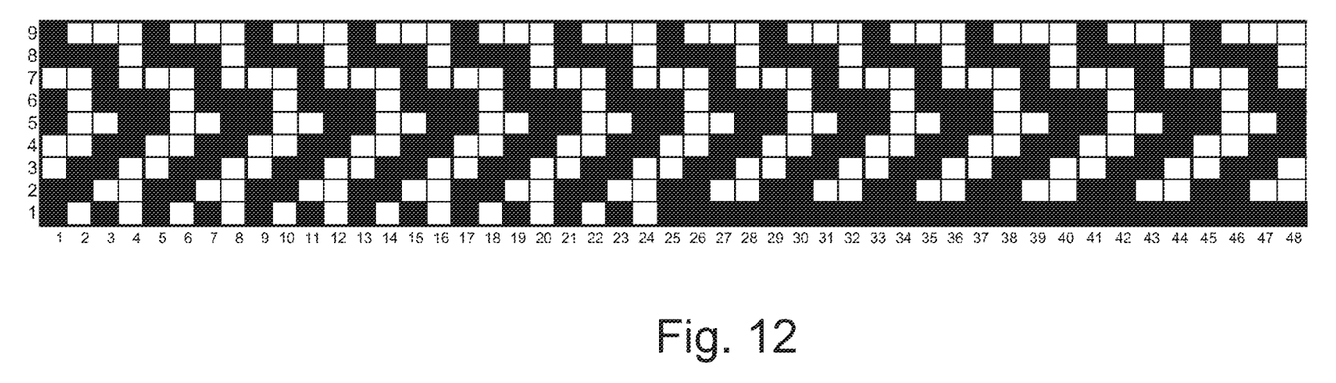
FIG. 12 is a weave diagram of a tie down cord assembly according to one embodiment.
Figure 13:
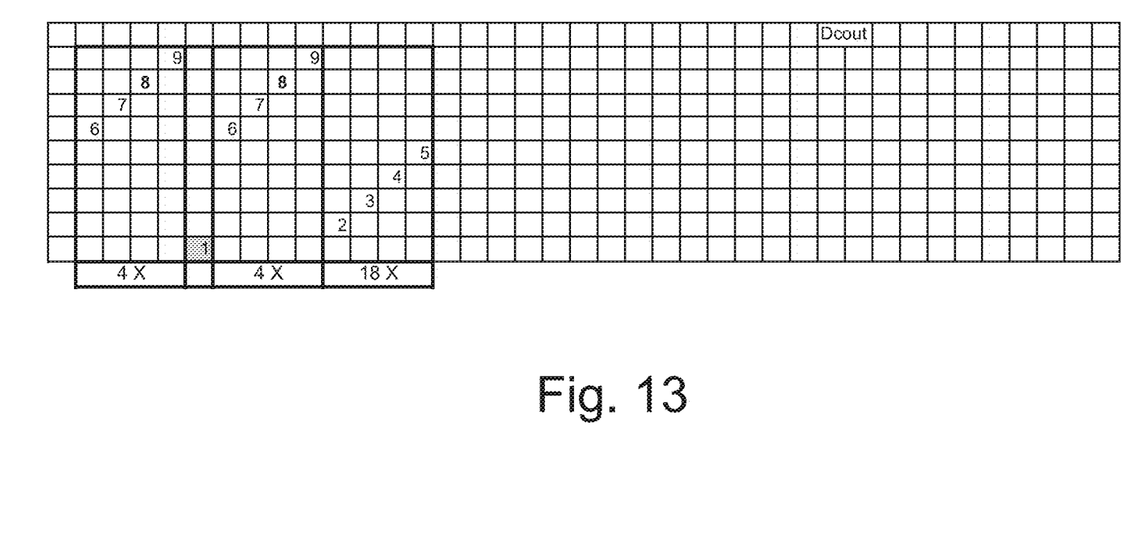
FIG. 13 is a drawing diagram of a tie down cord assembly according to one embodiment.

FIG. 12 illustrates a non-limiting pick diagram for a tie down cord assembly while FIG. 13 illustrates a non-limiting drawing diagram (harness plan) for the same.

Figure 14:
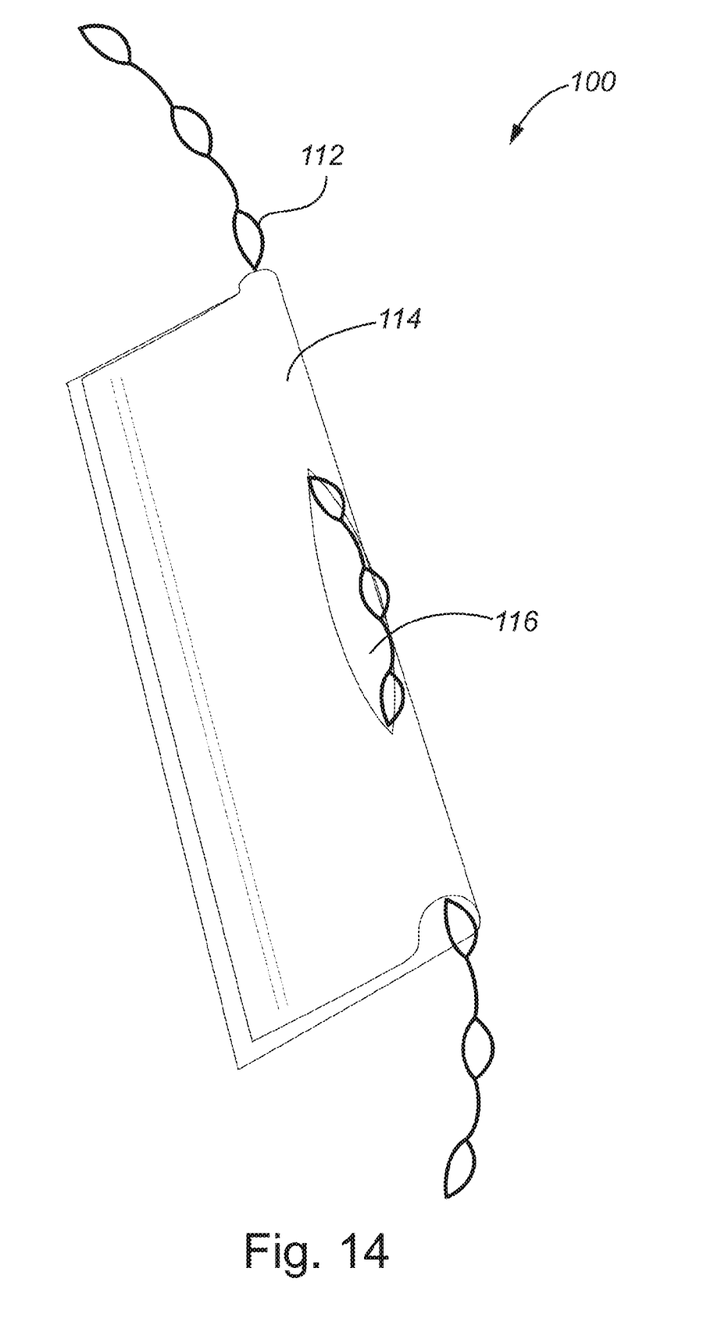
FIG. 14 is a perspective view of a cord assembled with fabric according to one embodiment.
Figure 15:
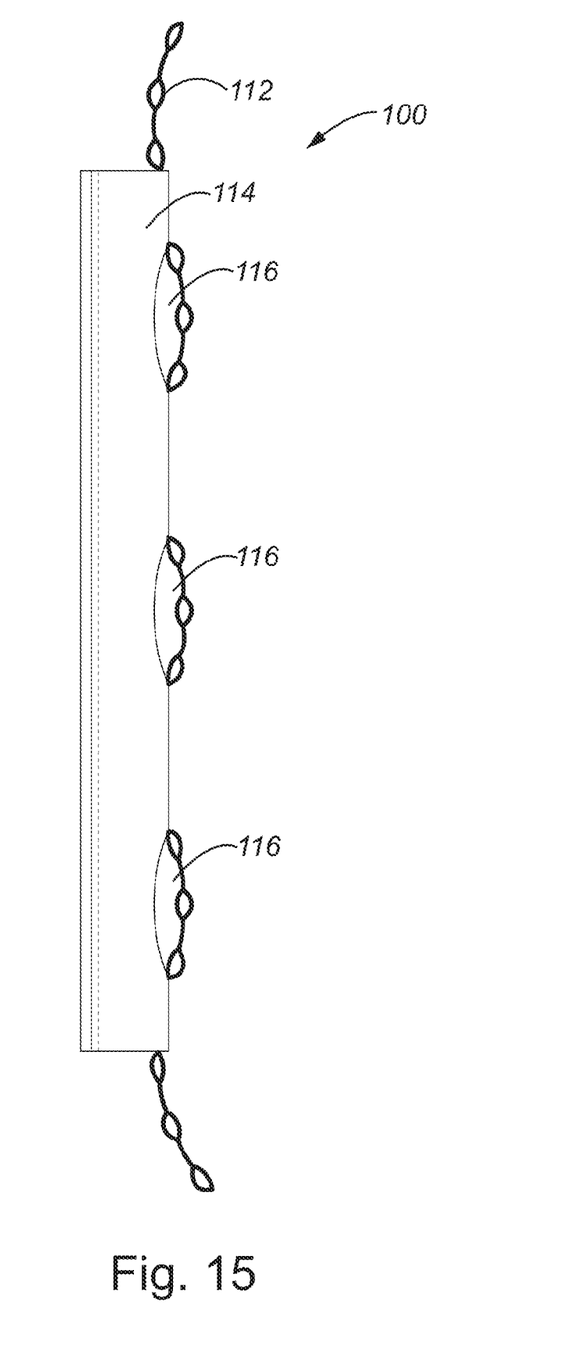
FIG. 15 is another perspective view of the assembly of FIG. 14.

FIGS. 14-15 show an alternate embodiment of a tie down cord assembly 100 where a webbing such as webbing 14 is not used at all. Instead, a slotted cord 112, which is similar in configuration to cord 12 described above, is inserted in between upholstery or other fabric 114 that has been folded over onto itself. Cord 112 exits the upholstery 114 at cut-out portions 116.

Also disclosed is a method of attaching the tie down cord assembly 10 to a vehicle seat. FIG. 6 illustrates one non-limiting embodiment where a tie down cord assembly 10 has been sewn or otherwise attached to fabric, upholstery or other covering 38 and then secured to the underside 34 of a vehicle seat frame 32. Specifically, as shown, cord 12, which exits the webbing 14 at various weave-out locations, is looped around various anchors 36 present on the underside of the vehicle seat frame. Thus, the weave-out portions are spaced at predetermined intervals to match the design of the seat frame. The configuration of the weave-out and weave-in portions may be selected so that the tie down cord assembly 10 is essentially universal and can be used with the pre-existing anchors of a number of different seat frames. In a non-limiting example, the weave-out portions are located approximately every two inches along the webbing 14, or spaced frequently enough to make the assembly universal so that it may be used with a number of different seat frames.

In some embodiments, the entire cord 12 is looped around the anchor 36 at attachment locations between the ends 30 of the webbing 14. At or near the webbing ends 30, cord 12 is cut at a slot section 22, and a hog pin 50 or other similar attachment structure is inserted into the loop 28 of the slot section 22 preceding the one that was cut. In this way, the tie down cord assembly 10 is anchored to the seat frame at the ends 30 of the webbing 14 without requiring any special end treatment to the webbing. Instead, the cord 12 itself is used to anchor the webbing (and the attached fabric or upholstery) to the seat frame 32. Because special end treatment of the webbing is not required, the tie down cord assembly is adjustable and may be used with any number of seat configuration and with seats having different dimensions. Moreover, because special end treatment is not required, both the cord and the tie down cord assembly are capable of being provided on spools or rolls.

Because the disclosed tunnel tie cord assembly is capable of being provided on rolls/spools and is universal in nature in that it can be used with many different seat frames, customers can order just one part number and cut the assembly where needed to fit the particular application, which reduces inventory and reduces space and storage requirements at the customer's facility. Moreover, because additional fabrication is not required for the end of the assembly, costs are reduced. Finally, because the tie down cord assembly is woven with the cord, separate assembly of the cord and the webbing is not required, reducing labor costs.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the disclosed invention is not limited to the embodiments described above or depicted in the drawings, and various embodiments and modifications can be made without departing from the scope of the claims below.

The invention claimed is:

1. A tie down cord assembly for securing fabric to a vehicle seat, the assembly comprising:
    a webbing comprising a tunnel portion and a flat portion that is configured to attach to the fabric;
    a cord comprising a plurality of slot sections and a plurality of flat sections, wherein adjacent slot sections are separated by one of the flat sections, wherein each slot section comprises an upper portion and a lower portion,
    wherein the cord is received within the tunnel portion of the webbing and is woven out of the tunnel portion and back into the tunnel portion at predetermined intervals along the webbing; and
    wherein the cord is configured to attach to an underside of the seat between two ends of the webbing in a first attachment manner and wherein the cord is configured to attach to the seat at the two ends of the webbing in a second attachment manner that is different from the first attachment manner.

2. The tie down cord assembly of claim 1, wherein the second attachment manner comprises separating the upper portion of one of the slot sections from the lower portion of that slot section to form a loop, wherein the loop is configured to attach to a component associated with the underside of the seat.

3. The tie down cord assembly of claim 2, wherein the first attachment manner comprises looping the cord around a component associated with the underside of the seat.

4. The tie down cord assembly of claim 1, wherein the upper portion of the slot sections has a tensile property that is different from a tensile property of the lower portion of the slot sections.

5. The tie down cord assembly of claim 4, wherein the upper portions of the slot sections comprise a plurality of warp yarns that are either nylon or polyester and wherein the lower portions of the slot sections comprise a plurality of warp yarns that are the other of nylon or polyester.

6. The tie down cord assembly of claim 1, wherein the cord comprises a plurality of warp yarns, a first set of weft yarns, and a second set of weft yarns,
    wherein, in the cord flat sections, the plurality of warp yarns are woven together using both the first set of weft yarns and the second set of weft yarns, and
    wherein, in the cord slot sections, some of the plurality of warp yarns are woven together with the first set of weft yarns to form the upper portions of the slot sections and wherein the rest of the plurality of warp yarns are woven together with the second set of weft yarns to form the lower portions of the slot sections.

7. A method of installing a tie down cord assembly comprising:
    providing a cord comprising a plurality of slot sections and a plurality of flat sections, wherein adjacent slot sections are separated by one of the flat sections and wherein the slot sections each comprise an upper portion and a lower portion that together define a loop;
    providing the cord within a tunnel portion of a webbing to form a tie down cord assembly, wherein the cord is woven out of the tunnel portion of the webbing at predetermined exit points and the cord is woven back into the tunnel portion of the webbing at predetermined entrance points;
    securing the tie down cord assembly to a fabric; and
    attaching the cord to an underside of a vehicle seat between two ends of the webbing in a first manner and attaching the webbing to the underside of the vehicle seat at the two ends of the webbing in a second manner that is different from the first manner.

8. The method of claim 7, wherein a portion of the fabric is attached to the underside of the vehicle seat by, at various locations between the ends of the webbing, securing the cord that is woven out of the webbing at the predetermined exit points to anchors provided on the underside of the vehicle seat; and
    at or near the ends of the webbing, cutting the cord along the loop of one of the slot sections and attaching the cord to the underside of the vehicle seat via the loop of the preceding slot section.

9. The method of claim 7, wherein the second attachment manner comprises separating the upper portion of the slot section from the lower portion of the slot section and attaching the cord to the underside of the seat via the loop.

10. The method of claim 7, wherein the first attachment manner comprises looping the cord around an anchor associated with the underside of the seat.

11. The method of claim 7, wherein the cord is woven within the webbing so that at least one slotted portion of the cord is woven out of the webbing at at least some of the predetermined exit points.

12. The method of claim 7, wherein the cord is woven into the tunnel portion of the webbing.

13. A tie down cord assembly comprising:
    a fabric comprising a flat portion and a tubular section;
    a cord comprising a plurality of warp yarns, a first set of weft yarns, and a second set of weft yarns;

wherein the plurality of warp yarns are woven together using both the first set of weft yarns and the second set of weft yarns to form a plurality of cord flat sections; and wherein some of the plurality of warp yarns are woven together with the first set of weft yarns to form an upper portion of a slot section and wherein the rest of the plurality of warp yarns are woven together with the second set of weft yarns to form a lower portion of the slot section, wherein the slot section comprises a plurality of slot sections and wherein the cord flat sections separate the cord slot sections from one another;

wherein the upper portions of the slot sections have a first tensile property that is different from a second tensile property of the lower portions of the slot sections; and wherein the cord is received within the fabric.

14. The tie down cord assembly of claim 13, wherein the warp yarns of the upper portions are either nylon or polyester and the warp yarns of the lower portions are the other of nylon or polyester.

15. The tie down cord assembly of claim 14, wherein the cord is configured to attach to a vehicle seat via a first attachment mechanism between ends of the fabric and wherein the cord is configured to attach to the vehicle seat via a second attachment mechanism at or near the ends of the fabric, where the second attachment mechanism is different from the first attachment mechanism.

16. The tie down cord assembly of claim 15, wherein the second attachment mechanism comprises separating the upper portion of one of the slot sections from the lower portion of that slot section to form a loop, and attaching the cord to an underside of the vehicle seat via the loop.

17. A tie down cord for securing fabric to a seat comprising a plurality of slot sections and a plurality of connection sections, wherein adjacent slot sections are separated by one of the connection sections, wherein each slot section comprises an upper portion and a lower portion, wherein the cord is configured to attach to an underside of the seat at or near two ends of the cord by a first attachment mechanism formed by one of the slot sections wherein the upper portion of the one of the slot sections is separated from the lower portion of the one of the slot sections to form a loop and wherein the loop is configured to attach to a component associated with the underside of the seat, and wherein a height of the cord is similar to a width of the cord.

18. The tie down cord of claim 17, wherein the cord is configured to attach to the underside of the seat between the two ends of the cord by a second attachment mechanism, where the first attachment mechanism is different from the second attachment mechanism.

19. The tie down cord of claim 18, wherein the second attachment mechanism comprises looping the cord around an anchor associated with the underside of the seat.

20. The tie down cord of claim 19, wherein looping the cord around the anchor comprises looping both the upper portion and the lower portion of at least one of the slot sections around the anchor.

21. The tie down cord of claim 17, wherein the slot sections extend throughout a length of the cord at regular intervals.

22. The tie down cord of claim 17, wherein the upper portions of the slot sections have a tensile property that is different from a tensile property of the lower portions of the slot sections.

* * * * *